(No Model.)
S. POTTORF.
SUCKER ROD ELEVATOR.
No. 432,193. Patented July 15, 1890.
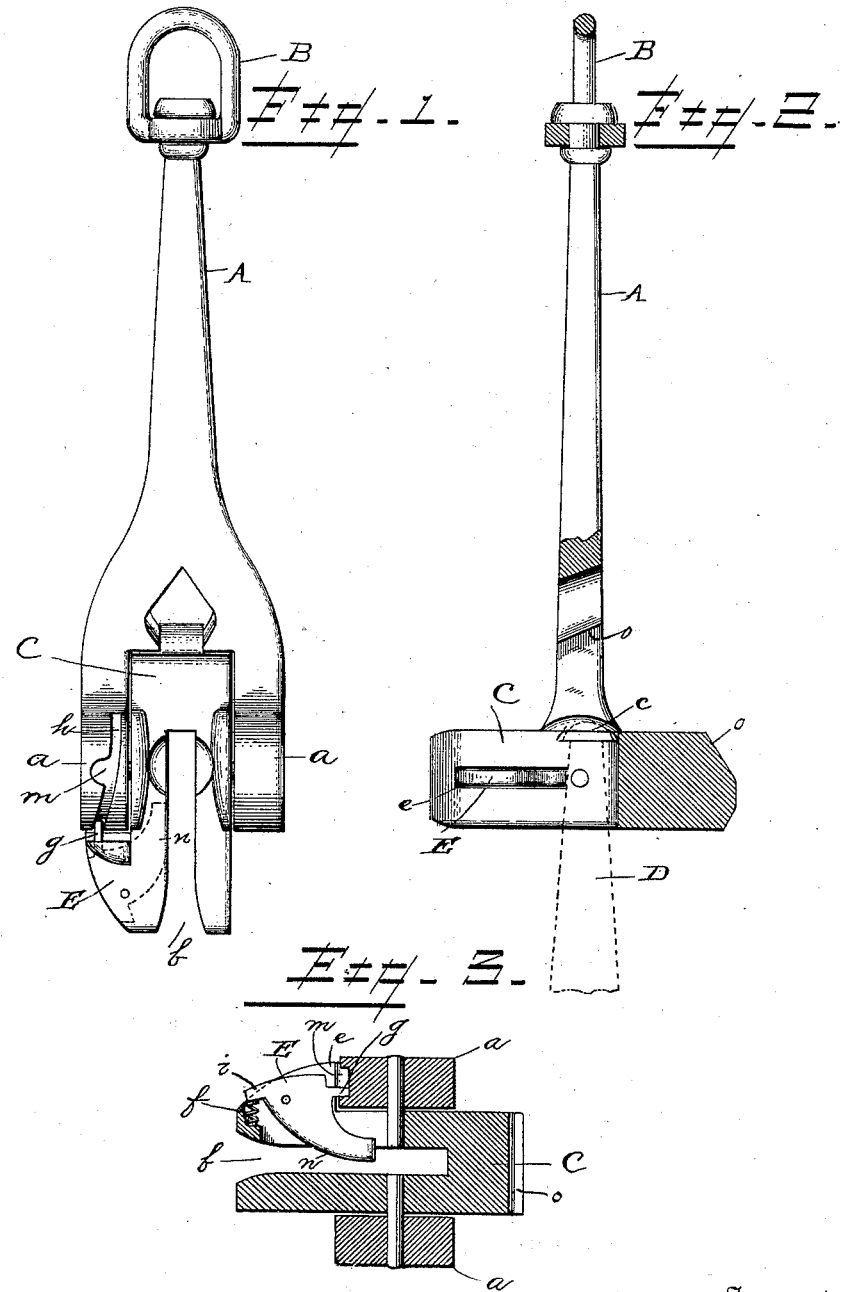
Witnesses
Albert B. Blackwood
Jos H Blackwood
Inventor
Seymour Pottorf
by Soule
his Attorneys

UNITED STATES PATENT OFFICE.

SEYMOUR POTTORF, OF EMLENTON, PENNSYLVANIA.

SUCKER-ROD ELEVATOR.

SPECIFICATION forming part of Letters Patent No. 432,193, dated July 15, 1890.

Application filed May 14, 1890. Serial No. 351,790. (No model.)

*To all whom it may concern:*

Be it known that I, SEYMOUR POTTORF, of Emlenton, in the county of Venango and State of Pennsylvania, have invented certain new and useful Improvements in Sucker-Rod Elevators, of which the following is a specification.

The object of this invention is to provide a tool for grasping and elevating sucker-rods, which can be conveniently and quickly attached to and detached from the sucker-rods, and which will grasp the rod firmly, securely, and without liability of accidental detachment.

The improved elevating-tool is illustrated in the accompanying drawings, wherein—

Figure 1 is a front view of the tool. Fig. 2 is a side view thereof, partly in section, showing it in position for elevating a sucker-rod; and Fig. 3 is a detail view.

The tool is formed with a stem or rod A, having at one end a swiveled eye B for connecting it with a hook or other means of attachment. The lower end of the rod or stem A is forked, and between the two branches $a$ $a$ thereof is journaled a sucker-rod gripper C. This gripper is journaled so as to turn in a vertical plane, so that it can swing from the vertical position shown in Fig. 1 to the horizontal position shown in Fig. 2. The gripper is formed with a longitudinal slot $b$, which is open at the end of the gripper which is lowermost when the gripper is turned down, as in Fig. 1. The body of the sucker-rod D is embraced by this slot; but its width is less than that of the head $c$ of the sucker-rod. When the sucker-rod is held in the slot $b$, the handle or stem is turned to a vertical position at right angles to the gripper C to elevate the sucker-rod, as in Fig. 2. The sucker-rod is then located at the rear closed end of slot $b$, so that it is back of the journals of the gripper. Consequently while the sucker-rod is being raised there is no liability of its falling out by its own weight. To prevent, however, the accidental displacement of the sucker-rod, a locking-dog E is employed. This dog is pivoted in a slot $e$ in the gripper, which occupies a plane at right angles to that of the slot $b$ and communicates therewith. The inner end of this dog normally projects partly across the slot $b$, so as to close the inner portion of the same, and is maintained in this position by a coiled spring $f$. When the stem A and gripper C are brought in line with each other, as in Fig. 1, the dog E is automatically withdrawn from obstructing the slot $b$ by means of a projecting lug $g$ on the dog, which engages and works in a cam-groove $h$ in the adjacent forked branch $a$ of the stem A. This cam-groove $h$, acting on the lug $g$, also restores the dog to its normal obstructing position when the gripper and stem A are brought at right angles to each other, as in Fig. 2. In order, however, that the sucker-rod may be removed without turning the stem A and gripper C relatively to each other, the dog E is adapted to be turned by hand, it being provided with a projecting push end $i$ for this purpose, and the cam-groove $h$ being provided with an enlargement $m$ to accommodate the movement of the lug $g$; hence the dog can be operated either automatically or by hand. It is beveled on one face at $n$, so that the sucker-rod can be pressed by it for insertion into the slot $b$ when the gripper is in its horizontal position.

The movement of the gripper in the wrong direction is prevented by abutting beveled shoulders $o$ $o$ on the gripper and stem, respectively.

The open-ended slot $b$ enables the tool to be utilized as a wrench.

I claim as my invention—

The stem A, having one end forked, one of said forks having a cam-groove $h$ with an enlargement $m$, in combination with the gripper C, journaled between said forked ends, so as to swing from a position in line with said stem to a position at right angles thereto, said gripper having an open-ended slot into which a sucker-rod may be inserted, an automatically-acting locking-dog adapted to move so as to obstruct said slot and make the same clear, said dog having a lug entering into said cam-groove, said lug being also capable of moving in said enlargement $m$ when said gripper occupies its position at right angles to said stem, and a spring acting to hold said dog in its obstructing position, substantially as set forth.

In witness whereof I have hereunto signed my name in the presence of two subscribing witnesses.

SEYMOUR POTTORF.

Witnesses:
JAMES BENNETT,
E. H. CUBBISON.